(12) United States Patent
Morais

(10) Patent No.: US 7,802,110 B2
(45) Date of Patent: Sep. 21, 2010

(54) SYSTEM AND METHOD FOR SECURE EXECUTION OF PROGRAM CODE

(75) Inventor: Dinarte R. Morais, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1149 days.

(21) Appl. No.: 10/925,657

(22) Filed: Aug. 25, 2004

(65) Prior Publication Data

US 2006/0047958 A1  Mar. 2, 2006

(51) Int. Cl.
*G06F 12/14* (2006.01)

(52) U.S. Cl. ..................................... 713/193

(58) Field of Classification Search ................. 713/160, 713/164, 166, 176, 181, 190, 193; 380/30, 380/251; 726/1
See application file for complete search history.

(56) References Cited

U.S. PATENT DOCUMENTS

| 5,421,006 | A | 5/1995 | Jablon et al. ................... 714/36 |
| 5,652,793 | A | 7/1997 | Priem et al. ..................... 705/56 |
| 5,740,248 | A | 4/1998 | Fieres et al. .................... 380/25 |
| 5,867,647 | A | 2/1999 | Haigh et al. ................. 395/186 |
| 5,944,821 | A | 8/1999 | Angelo ......................... 713/200 |
| 6,151,618 | A | 11/2000 | Wahbe et al. .................... 718/1 |
| 6,633,963 | B1 | 10/2003 | Ellison et al. ................ 711/163 |
| 6,651,171 | B1 | 11/2003 | England et al. .............. 713/193 |
| 6,745,307 | B2 | 6/2004 | McKee ......................... 711/163 |
| 7,308,576 | B2 * | 12/2007 | Glew et al. ................... 713/170 |
| 2002/0007456 | A1 | 1/2002 | Peinado et al. .............. 713/164 |
| 2002/0016846 | A1 | 2/2002 | Ono ............................ 709/229 |
| 2002/0023214 | A1 * | 2/2002 | Shear et al. .................. 713/170 |
| 2002/0144077 | A1 | 10/2002 | Andersson et al. |
| 2002/0150243 | A1 | 10/2002 | Craft et al. ................... 380/201 |

(Continued)

FOREIGN PATENT DOCUMENTS

CN  1097772 C  1/2003

(Continued)

OTHER PUBLICATIONS

Black, J. et al., "UMAC: Fast and Secure Message Authentication," *Advances in Cryptology—CRYPTO '99*, Lecture Notes in Computer Science, Wiener, M. (ed.), 1999, vol. 1666, 18 pages.

(Continued)

*Primary Examiner*—Ellen Tran
(74) *Attorney, Agent, or Firm*—Woodcock Washburn LLP

(57) ABSTRACT

A system comprises a memory and a processor that supports different privilege levels. Only program code executing at a certain privilege level is permitted to map memory and to assign access permission to the mapped memory, such as read-only, writable, and executable. Control code executing on the processor at that privilege level, in response to a request from other code executing at a different privilege level, maps a portion of memory for loading an executable file. After the executable file has been loaded into the mapped memory, the control code then verifies a signature associated with the executable file. If the signature is verified, the control code permits the executable file to be executed by the processor at a privilege level other than the one at which the control code executes. Otherwise, the control code prevents the executable file from being executed on the processor.

24 Claims, 8 Drawing Sheets

U.S. PATENT DOCUMENTS

| | | | |
|---|---|---|---|
| 2002/0194389 A1* | 12/2002 | Worley et al. | 709/310 |
| 2003/0115476 A1 | 6/2003 | McKee | |
| 2003/0126442 A1* | 7/2003 | Glew et al. | 713/170 |
| 2004/0064668 A1 | 4/2004 | Kjos et al. | 711/202 |
| 2004/0158742 A1 | 8/2004 | Srinivasan et al. | 713/201 |
| 2004/0177243 A1 | 9/2004 | Worley, Jr. | |
| 2005/0114687 A1 | 5/2005 | Zimmer et al. | 713/193 |

FOREIGN PATENT DOCUMENTS

| | | |
|---|---|---|
| CN | 1445693 A | 10/2003 |
| EP | 0 886 202 A3 | 12/1998 |
| EP | 0 886 202 B1 | 6/2003 |
| EP | 1 346 755 A2 | 9/2003 |

OTHER PUBLICATIONS

Engler, D. et al., "The Operating System Kernel as a Secure Programmable Machine," *Proceedings of the 6th Workshop on ACM SIGOPS European Workshop: Matching Operating Systems to Application Needs*, Wadern, Germany, 1994, 62-67.

Halevi, S. et al., "A Tweakable Enciphering Mode," *Advances in Cryptology—CRYPTO '03*, Lecture Notes in Computer Science, Boneh, D. (ed.), 2003, vol. 2729, 33 pages.

Jutla, C.S., "Encryption Modes with Almost Free Message Integrity," *Proceedings of the International Conference on the Theory and Application of Cryptographic Techniuqes: Advances in Cryptology*, 2001, 15 pages.

Kirovski, D. et al., "Enabling Trusted Software Integrity," *Proceedings of the 10th International Conference on Architectural Support for Programming Languages and Operating Systems*, San Jose, California, 2002, 108-120.

Lie, D. et al., "Implementing an Untrusted Operating System on Trusted Hardware," *Proceedings of the 19th ACM Symposium on Operating Systems Principles*, Bolton Landing, New York, 2003, 178-192.

Lie, D. et al., "Architectural Support and Tamper Resistant Software," *ACM SIGPLAN Notices*, 2000, 35(11), 8 pages.

Schroeder, M.D. et al., "A Hardware Architecture for Implementing Protection Rings," *Communications of the ACM*, Mar., 1972, 15(3), 157-170.

Suh, G.E. et al., "AEGIS: Architecture for Tamper-Evident and Tamper-Resistant Processing," *Proceedings of the ICS*, San Francisco, California, 2003, 160-171.

Suh, G.E. et al., "Hardware Mechanisms for Memory Integrity Checking," 2002, 18 pages.

Suh, G. E. et al., "Efficient Memory Integrity Verification and Encryption for Secure Processors," *Proceedings of the 36th International Symposium on Microarchitecture*, 2003, 1-12.

Wetzel, J. et al., "PowerPC Operating Environment Architecture," Dec. 2003, *Book III*, Version 2.01, Table of Contents and pp. 1-119.

Wu, M. et al., "Improving TLB Miss Handling with Page Table Pointer Caches," Dec. 1997, 10 pages.

Zachary, J. et al., "Bidirectional Mobile Code Trust Management Using Tamper Resistant Hardware," *Mobile Networks and Applications*, 2003, 8, 137-143.

Axford, C., et al., "IBM's Operating System 2," 2002, *CS 450/Section 2*, 1-14.

In the United States Patent and Trademark Office, Non-Final Office Action in re:. U.S. Appl. No. 10/925,697, filed Aug. 25, 2004, Dated Dec. 5, 2006, 14 pages.

In the United States Patent and Trademark Office, Final Office Action in re:. U.S. Appl. No. 10/925,697, filed Aug. 25, 2004, Dated Apr. 24, 2007, 10 pages.

In the United States Patent and Trademark Office, Reply Pursuant to 37 C.F.R sec 1.111 in re:. U.S. Appl. No. 10/925,697, filed Aug. 25, 2004, Dated Mar. 5, 2007, 11 pages.

In the United States Patent and Trademark Office, Reply Pursuant to 37 C.F.R sec 1.111 in re:. U.S. Appl. No. 10/925,697 filed Aug. 25, 2004, Dated Jun. 27, 2007, 6 pages.

\* cited by examiner

SYSTEM AND METHOD FOR SECURE EXECUTION OF PROGRAM CODE

CROSS-REFERENCE TO RELATED APPLICATIONS

The subject matter of this application is related to the subject matter of the following co-pending applications, each of which is incorporated herein by reference it its entirety:

Ser. No. 10/101,999, filed Mar. 19, 2002, entitled "Secure Digital Data Format And Code Enforced Policy"; and Ser. No. 10/632,250, filed Aug. 1, 2003, entitled "Media Data Protection with Secure Installer"; and Ser. No. 10/925,697, filed Aug. 25, 2004, entitled "System and Method for Secure Computing".

FIELD OF THE INVENTION

This invention generally relates to validating digital data before enabling its use, and more particularly, to a system and method for ensuring that program code to be executed on a processor is properly signed and has not been modified.

BACKGROUND OF THE INVENTION

The personal computer provides a platform on which anyone willing to invest the effort in programming can write programs that can carry out almost any desired function, limited only by the constraints of the programming language, the operating environment, and the hardware on which the program is executed. The manufacturers of personal computers and those providing the operating systems and programming tools place little restriction on how a user chooses to use their respective products. However, there are instances where it may be important to restrict how computing devices are used. In the broadest sense, a computing device may be any device that includes a processor that executes program code stored in a memory to perform some function. Thus, a computing device can have a dedicated function, or may be very general in functionality, just as a typical personal computer is. As used herein, the terms "code," "program code," and "control code" refer to a set of instructions that are executed by a machine, such as a processor of a computing device.

One type of computing device that is similar in some ways to a personal computer, yet is more specialized in its primary function, is a multimedia console. Although multimedia consoles can often perform other functions, their primary function is to execute machine instructions, or program code, to enable one or more users to play various types of multimedia, such as video, audio, and games. The companies that produce multimedia consoles have a substantial interest in controlling various aspects of any multimedia software that is executed on their consoles. For example, they will want to ensure that the quality of the multimedia software meets certain specifications. Since the manufacturers of multimedia consoles typically license other companies to produce multimedia software that is usable on their multimedia consoles, it is preferable to preclude unlicensed software from being used on the console. Aside from the loss of revenue that would result if unlicensed software is played on a multimedia console, there is also an issue of maintaining quality control over software that is played on the multimedia console. Also, it will be important to ensure that software licensed for use on a multimedia console has not been modified after it was approved for distribution and released to the public. Without such controls being applied, multimedia software might be "hacked" to circumvent licensing restrictions or to add features or functionality that were not included in the authorized software when it was originally approved for distribution by the software company under license from the maker of the multimedia console.

In one class of multimedia consoles, referred to as game consoles, hardware-related techniques have been used in the past for authenticating software plug-in cartridges used to store game software. For example, in some game consoles, the housing of authorized software game cartridges and a corresponding receptacle in the game console are formed to prevent cartridges of a different shape from being inserted into the receptacle. In addition, some game cartridges include a processor and a read only memory (ROM) that stores specific data needed to authenticate the cartridge. If the result of a calculation carried out by both the processor in the game console and the processor in the cartridge do not match, the game console will not enable the software for the game stored in the cartridge to execute on the game console.

Because of the richness of the graphics and the complexity of games and multimedia content designed to run on current generation multimedia consoles, the multimedia software is more efficiently distributed on optical storage media, such as compact disc-read only memory discs (CDROMs) or digital versatile discs (DVDs). Accordingly, alternative approaches that do not rely upon the physical shape of the medium on which the multimedia software resides must be employed. Details of how other multimedia console manufacturers have chosen to address this problem are not readily available. Clearly, systems and methods for determining whether software distributed on these media is properly signed and has not been modified or altered are desirable.

Many processors used in various computing devices provide support for assigning different levels of "privilege" to different executable program code within a computer system as a form of security against unauthorized execution of program code. Program code can include source code written in a high level programming language, assembly language, or machine-language, and the code can be executed in compiled form or via interpretation. With processors that support different privilege levels, some program code may be permitted to execute on the processor at a higher privilege level than other code. Generally, program code that executes at a "higher" privilege level will have greater access to certain parts of the instruction set of the processor and to other hardware resources of the computing device.

A privilege level, sometimes also referred to as a "ring," can be thought of as a logical division of hardware and software within a computing device. A privilege level (or ring) typically determines the total range or ranges of memory that executing program code can access as well as the range of instructions within the total instruction set of a processor that can be executed by the processor on behalf of that program code. An attempt by certain program code to access a memory range or a processor instruction outside of its privilege level typically will result in a processor fault. Program code afforded a higher privilege level (or ring) typically has privileges inclusive of that of other program code afforded a lower privilege level (or ring). Some processors support just two privilege levels, while others provide support for three, four, or more privilege levels.

For example, the architecture of the x86 series of processors manufactured by Intel Corporation provide four privilege levels, which range from "Ring 0," the highest privilege level, to "Ring 3," the lowest privilege level. Program code assigned to a particular privilege level can only access data and other programs which are assigned to the same or a lower privilege level. Thus, program code assigned to "Ring 2" can invoke (i.e., call) other program code assigned to Ring 2 as well as program code assigned to Ring 3, but it can not make a direct call to program code at either Ring 1 or Ring 0. As another example, the PowerPC® microprocessor architecture developed jointly by IBM Corporation, Motorola, Inc. and Apple Computer, Inc. supports three privilege levels referred to as the hypervisor mode (highest level), supervisor mode, and user mode (lowest level).

Generally, the current privilege level at which a processor executes certain program code is established by setting an appropriate bit or combination of bits in a hardware register within the processor. The details of the privileges provided at each level are implementation dependent, and not essential to the understanding of the present invention.

The privilege level concept is most often used to prevent full access to computing resources by application programs. Typically, an operating system developer will assign the highest privilege level to certain key portions of the operating system, such as the operating system kernel, but will relegate other operating system services and application programs to lower privilege levels. In order to obtain services that employ resources not directly available to application programs, application programs need to call operating system routines through the operating system interface. Those operating system routines can then promote the current privilege level of the processor to the higher privilege level in order to access the necessary resources, carry out the task requested by the application program, and then return control to the application program while simultaneously demoting the privilege level of the processor back to the lower level. Privilege levels can also be used to prevent the processor from executing certain privileged instructions on behalf of an application program. For example, instructions that alter the contents of certain registers in the processor may be privileged, and may be executed by the processor only on behalf of an operating system routine running at the highest privilege level. Generally, restricted instructions include instructions that manipulate the contents of control registers, such as the registers of a memory management unit, and special operating system data structures.

Another mechanism that many processors employ to provide security against unauthorized use of digital data or program code in a computing device is the ability to grant different access permissions to different locations of the memory of the computing device. Access permissions are sometimes also provided to ranges of memory locations, such as a "page" of memory in a system that supports allocation of memory "pages," either in real memory or virtual memory. For example, real or virtual memory may be divided into pages of a fixed size, such as 4 kilobytes.

Many processors support several types of memory access permissions that can be applied to a given location or a given page of memory, such as READ, WRITE, and EXECUTE permissions. Different combinations of these permission can be applied to a given location or page of memory to effect a desired level of protection. For example, a page of memory assigned only the READ permission will be read-only, whereas a page of memory assigned both the READ and WRITE permissions will permit both read and write access to the page (i.e., "read/write" access). A page or portion of memory assigned the WRITE permission is said to be "writable." A memory page having the EXECUTE permission (which can be combined with the READ and WRITE permissions) can be used for the purpose of enabling any program code stored in the memory page to be executed. That is, program code stored in such a memory page has permission to be executed by the processor; the memory page is said to be "executable." Typically, a table is maintained by the processor that indicates the various access permissions assigned to any memory locations that have been allocated to the operating system or an application program.

While the concepts of privilege levels and memory access permissions are useful in placing some restrictions on data and program code within a computing device, neither one of those concepts alone is sufficient to ensure that only properly signed code is executed by a processor and that such program code has not been modified or altered. Systems and methods for ensuring that only properly signed program code is executed on a processor and that such program code has not been modified or altered continue to be desirable. The present invention addresses this need.

SUMMARY OF THE INVENTION

The present invention is directed to systems and methods for ensuring that only properly signed program code (in the form of an executable file) is executed in a computing device and that such program code has not been modified or altered prior to execution. The present invention takes advantage of support in a processor for different privilege levels, and in particular, support for limiting to a particular privilege level the ability of program code to map memory and to assign access permissions to the mapped memory. According to the present invention, first control code is provided that executes on the processor at a privilege level that permits the first control code, and only the first control code, to map portions of memory and to designate the mapped portions of memory as read-only, writable, or executable (i.e., assigning or setting access permissions on the mapped memory). The first control code receives requests from other code executing at a different privilege level (one that does not permit mapping of memory or assigning of access permissions) to map a portion of memory for loading an executable file. In one embodiment, such requests are received from second control code running in a lower privilege level that does not permit mapping of memory or assigning of access permissions. In response to such a request, the first control code, on behalf of the other code (e.g., the second control code), maps a portion of memory for loading the executable file. The other code is then responsible for loading the executable file into the mapped memory. Once the executable file is loaded, the first control code then verifies a signature associated with the executable file. In one embodiment of the invention, the first control code may designate the mapped portion of memory as read-only by, for example, setting a READ permission on the mapped portion of memory, after the executable file has been loaded into the mapped portion of memory. This prevents other program code from attempting to modify the executable file before the first control code can verify the signature. If the signature is verified (and the integrity of the file is also verified), the first control code permits the executable file to be executed by the processor at a less privileged level than the level at which the first control code executes. In this manner, the first control code ensures that the executable file is properly signed and verifies the integrity of the executable file before permitting any program code within the executable file to be executed.

Other features and advantages of the invention will become evident hereinafter.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

An embodiment of the present invention is described below in regard to its use in a multimedia console that is designed to execute multimedia software distributed on a portable, removable computer-readable medium. It will be recognized that the present invention may also be implemented in any other computing device in which it is desired to ensure that only properly signed software is executed on the device and that such software has not been modified prior to use, including, by way of example and without any intended limitation, satellite receivers, set top boxes, arcade games, personal computers (PCs), portable telephones, personal digital assistants (PDAs), and other hand-held devices.

Exemplary Computing Environment

Figure 1:
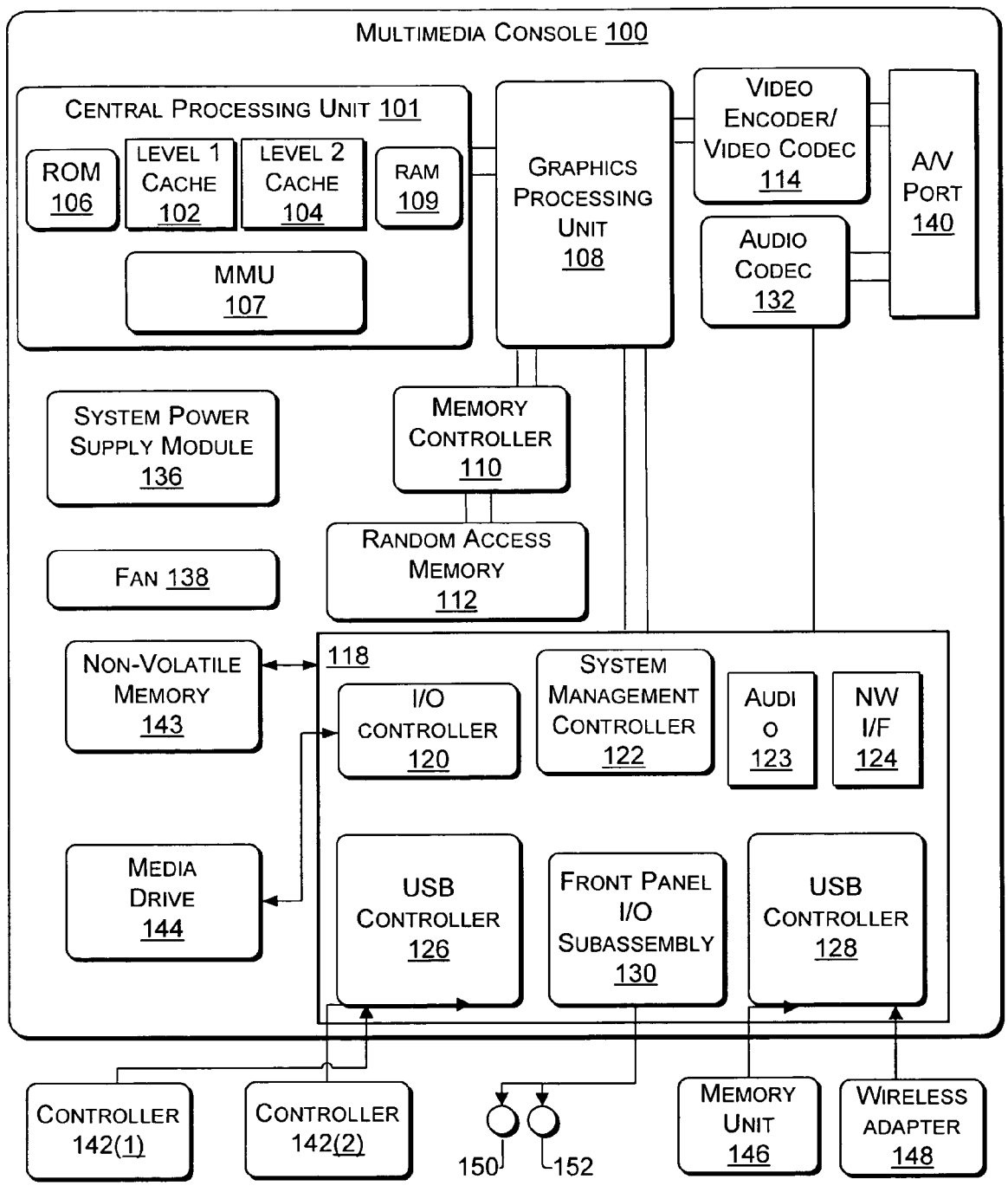
FIG. 1 is a block diagram of an exemplary multimedia console in which the present invention may be embodied.

FIG. 1 illustrates the functional components of a multimedia console 100 in which various aspects of the present invention may be implemented. The multimedia console 100 has a central processing unit (CPU) (sometimes also referred to simply as the "processor") 101 having a level 1 cache 102, a level 2 cache 104, a ROM (Read Only Memory) 106, and a RAM (Random Access Memory) 109. The caches 102, 104 temporarily store data and hence reduce the number of memory access cycles, thereby improving processing speed and throughput. The CPU 101 may be provided having more than one core, and thus, additional level 1 and level 2 caches 102 and 104. The ROM 106 may store executable code that is loaded during an initial phase of a boot process when the multimedia console 100 is powered ON, and the RAM 109 may be used during execution of the executable code within the ROM 106. Preferably, the ROM 106 and the RAM 109 are secure from tampering or alteration by means external to the processor. That is, the ROM 106 and RAM 109 are not accessible by hardware external to the processor; no signals placed on external pins of the processor can cause the ROM 106 to be read or the RAM 109 to be written or read (i.e., only circuitry internal to the processor 101 can read and/or write to the ROM 106 and RAM 109).

The processor 101 may further comprise a memory management unit (MMU) 107 to manage and support the mapping of memory within the console 100, including support for and management of virtual memory.

In the present embodiment, the processor 101 supports the execution of program code at different privilege levels (sometimes also referred to as "rings"). In the present embodiment, only program code executing at a first, or "highest" one of the privilege levels is permitted to map memory (i.e., map a page of virtual memory to a page of real memory) and to assign access permissions to the mapped memory (i.e., designate the mapped memory as read-only or writable and as executable or not). In one embodiment, the processor 101 implements the PowerPC® 64 architecture available from IBM Corporation, it being understood, however, that this is merely one example of a suitable processor architecture for practicing the present invention and that the present invention is by no means limited to any particular processor architecture.

In one embodiment, the processor enables different combinations of access permissions, such as READ, WRITE, and EXECUTE permissions, to be applied to a portion of memory, such as a page, to effect a desired level of protection. For example, a page of memory can be assigned only the READ permission in order to designate that page as read-only. A page of memory can also be assigned both the READ and WRITE permissions in order to permit both read and write access to the page (i.e., "read/write" access). A page of memory assigned the WRITE permission is said to be designated as "writable." In combination with the other permissions, an EXECUTE permission can also be set on a memory page for the purpose of enabling any program code stored in the memory page to be executed. That is, program code stored in such a memory page has permission to be executed by the processor; the memory page is said to be designated as "executable." If the EXECUTE permission is not set, then the processor will not allow instructions to be executed from that page. A table is maintained by the processor that indicates the various combinations of access permissions assigned to a given page of memory. It will be appreciated that different processors may implement these various forms of access permission differently. For example, another processor may implement a "READ-ONLY" permission for designating a page of memory as read-only, and a "READ/WRITE" permission for designating the page as permitting read/write access. In such a processor, the ability to designate a page of memory as executable or not may instead be implemented by a NO EXECUTE permission, which when set prevents instructions from being executed from the page and when not set permits execution. It is understood that the present invention is by no means limited to any particular implementation of these various forms of access permission in any given processor.

In one embodiment, the processor 101 supports three different privilege levels, designated as a "hypervisor" mode, a "supervisor" mode, and a "user" mode, it being understood that these terms are simply used for reference purposes, and that the privilege levels could just as easily be referred to as "privilege level 0," "privilege level 1," and "privilege level 2," or as another example, "ring 0," "ring 1," and "ring 2." In the present embodiment, the hypervisor mode is the highest privilege level (most privileged), and the user mode is the lowest privilege level. Only program code running in the hypervisor mode has access to resources for mapping memory and for setting access permissions on the mapped memory. Program code executing in the supervisor mode has access to most of the hardware features of the console 100, but does not have the ability to map memory or to set access permissions on mapped memory. Program code executing in the user mode may have restricted, or limited, access to the hardware and certain system services. In other embodiments, the processor 101 may have a different number of privilege levels, fewer or greater.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory external to the processor, such as, but not limited to, a RAM (Random Access Memory) 112.

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

Non-volatile memory 143 is provided to store application data that may be loaded during the boot process. A media drive 144 is provided and may comprise a DVD/CD drive, hard drive, or other drive that receives some form of removable, or portable media such as, without limitation, CDROMs, digital versatile disks (DVD) or other optical media, memory cards, memory sticks, magnetic cassettes, magnetic tape, magnetic disks or other magnetic media. The media drive 144 may be internal or external to the multimedia console 100. Application data, including executable files (i.e., files containing executable program code) may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 136 form a corresponding audio processing pipeline with high fidelity and stereo processing. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered ON, program code and data may be loaded from the non-volatile memory 143 into memory 112 and/or caches 102, 104 and executed on the processor 101. Application program code may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

SYSTEM AND METHOD OF THE PRESENT INVENTION

The present invention takes advantage of the support in the processor 101 for different privilege levels, and in particular, the support for limiting to a particular privilege level the ability of program code to map a virtual page of memory to a real page of memory and to assign access permissions to the mapped memory, in order to provide a mechanism for ensuring that only properly signed executable files can be executed on the processor and that such executable files are not tampered with or modified prior to execution. According to the present invention, first control code is provided that executes on the processor at a privilege level that permits the first control code, and only the first control code, to map portions of memory and to designate the mapped portions of memory as read-only, writable, or executable (i.e., setting access permissions on the mapped memory). The first control code receives requests from other code executing at a different privilege level (one that does not permit mapping of memory or assigning of access permissions) to map a portion of memory for loading an executable file. In one embodiment, such requests are received from second control code running in a lower privilege level that does not permit mapping of memory or assigning of access permissions. In response to such a request, the first control code, on behalf of the other code (e.g., the second control code), maps a portion of memory (i.e., maps a portion of virtual memory to a portion of real memory) for loading the executable file. The other code is then responsible for loading the executable file into the mapped memory. In one embodiment, once the executable file is loaded, the first control code may designate the mapped portion of memory as read-only by, for example, removing any WRITE permission and setting a READ permission on the mapped portion of memory (if not already applied). This prevents other program code from attempting to modify the executable file at that point. The first control code then verifies a signature associated with the executable file. If the signature is verified (and the integrity of the file is verified as described more fully below), the first control code permits the executable file to be executed by the processor at a less privileged level than the level at which the first control code executes. In this manner, the first control code ensures that the executable file is properly signed and verifies the integrity of the executable file before permitting any program code within the executable file to be executed.

Figure 2:
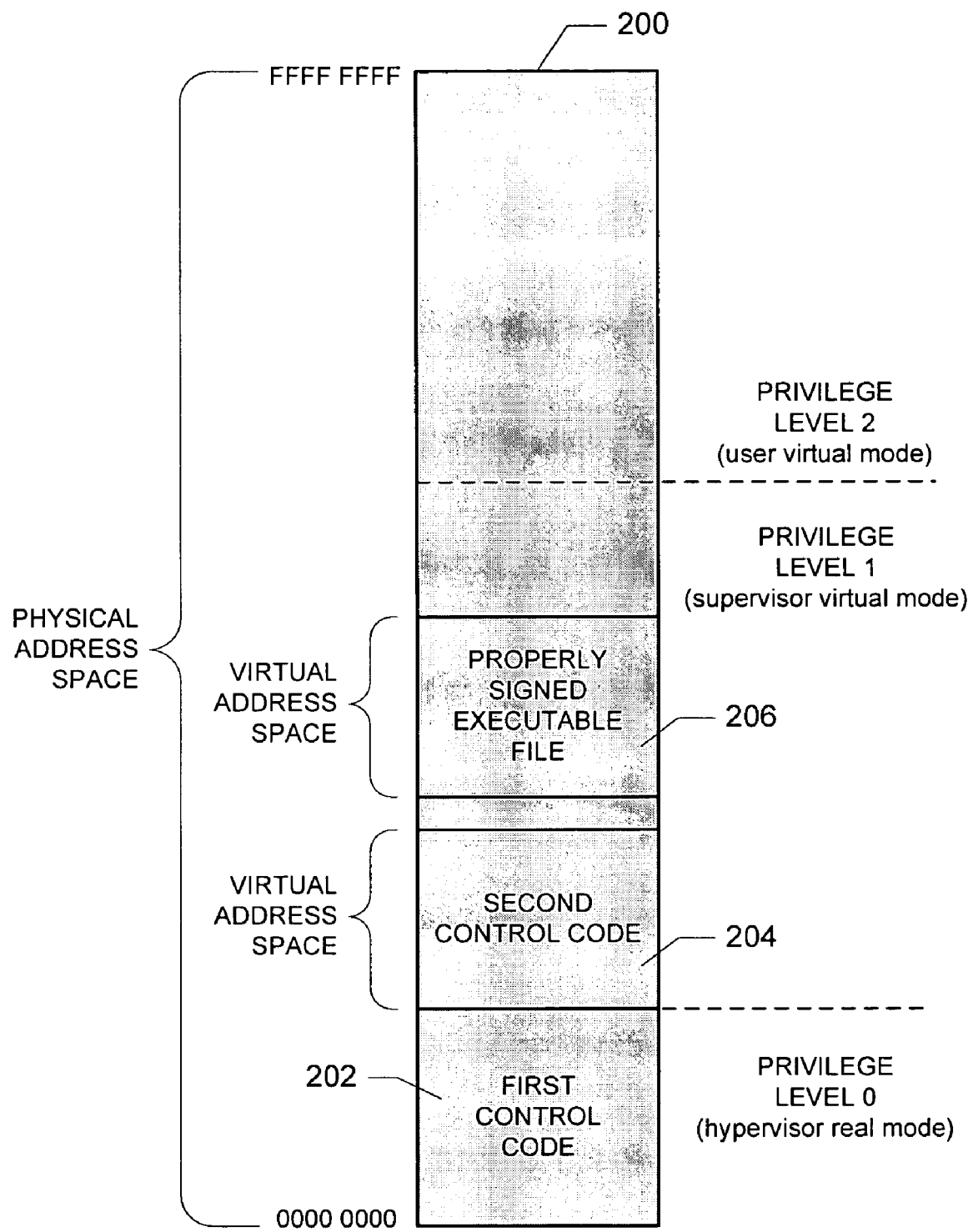
FIG. 2 is a diagram illustrating one embodiment of a system of the present invention in the exemplary multimedia console of FIG. 1.

FIG. 2 is a block diagram illustrating first control code 202 and second control code 204 executing within a memory space 200 of an exemplary computing device, such as multimedia console 100, in accordance with one embodiment of the present invention. The first control code 202 and the second control code 204 perform the functions of the present invention described above. To that end, the first control code 202 exposes certain application programming interfaces (APIs) to the second control code 204 in order for the second control code 204 to call, or invoke, the services of the first control code 202.

In the present embodiment, the first control code 202 runs in a real addressing mode of the processor 101 and, as discussed above, it executes at a privilege level that provides access to all the resources necessary to map a virtual page of memory to a real page of memory and to assign access privileges to the mapped page of memory. For example, in the exemplary system of FIG. 1, the first control code 202 executes in a hypervisor real mode of the processor 101, which is the highest (most privileged) level. In other embodiments, this privilege level may be referred to as, for example, "privilege level 0" or "ring 0." By virtue of its privilege level, the first control code 202 has read, write, and execute access to all the memory of the system 100.

In the present embodiment, the first control code 202 is capable of mapping pages of virtual memory to real pages of memory (i.e., physical memory) and in this regard serves as a virtual memory manager. Because the first control code 202 runs in the hypervisor mode of the processor, it has exclusive control over any virtual memory page tables within the processor 101. Consequently, it is the only program code in the system 100 capable of mapping or unmapping a virtual memory range to or from a real memory range, and it is the only program code capable of changing the access permissions (e.g., READ, WRITE, and EXECUTE) of a mapped virtual memory page. In the present embodiment, a single page table entry translates the virtual addresses of a page into real addresses. The page table entry stores the access permissions of the page.

Further according to the present embodiment, the second control code 204 is loaded into and executes from a virtual address space mapped by the first control code 202 into the real memory. The second control code provides other system services to other program code running on the system, such as for example, an application program. In one embodiment, the second control code 204 may comprise a variety of different program code modules normally associated with an operating system of a computing device, such as interrupt handlers, an operating system kernel, devices drivers, a file system, a network stack, and the like. As shown in FIG. 2, the second control code 204 executes at a lower privilege level (e.g., "privilege level 1" or "supervisor virtual mode") than the privilege level of the first control code 202. The second control code 204 thus does not have the ability to map pages of virtual memory to real memory or to assign access permissions to a mapped page of memory. Preferably, it also has no access to the program code or data of the first control code 202, and can only request the services of the first control code 202 through the API provided by the first control code 202.

In addition to the second control code 204, and as discussed more fully below, in the present embodiment, properly signed executable files 206 may also reside in virtual memory and execute in the supervisor mode ("privilege level 1") of the processor 101. Alternatively, the properly signed executable file could execute at even lower privilege levels of the processor, such as the "user mode" ("privilege level 2").

As will be recognized, in the present embodiment, the first control code 202 effectively "sandboxes" the code and data loaded in the supervisor mode. Program code executing in the supervisor mode preferably has no access to the first control code or data that resides in the hypervisor mode. Moreover, in accordance with another feature of the present invention, the first control code 202 prevents any virtual memory page that is designated as executable from also being designated writable, and the first control code 202 prevents any virtual memory page that is designated writable from also being designated executable. That is, the first program code 202 does not allow a page of virtual memory to be both writable and executable at the same time. If a page is writable, it is not executable, and if a page is executable, it is not writable. Moreover, only the first control code 202 (and not any program code running in supervisor mode or lower privilege levels) can change the access permission of a virtual memory page.

As mentioned above, in accordance with the present invention, executable files to be loaded and executed on the system preferably have some form of digital signature associated with them that the first program code 202 is responsible for verifying. As discussed more fully below, such files also include one or more digests of the contents of the file that can be used to verify the integrity of the program code and data in the executable files. In one embodiment, the executable files have the format illustrated in FIG. 4. According to the format shown, an executable file 400 has a header 404 and a plurality of sections 402 that contain the program code and/or data of the executable file. Preferably, the header contains information that identifies whether a given section has been designated as read-only or read/write and whether the section contains executable code. Prior to distribution of the executable file on portable media that can be inserted into the media drive 144 of the system 100, a digest of each section is computed using, for example, a hashing algorithm. Each of the section digests 406 is then stored in the header of the file. A digest of the header 404 (including the section digests and other header information) is then computed, and the header digest is encrypted. The encrypted digest 408 is then also stored in the file. In this embodiment, the private key used to encrypt the header digest 408 is part of private/public key pair generated in accordance with a public key encryption algorithm. As such, the encrypted header digest represents a form of digital signature associated with the executable file 400. In the case of the exemplary multimedia console 100 of FIG. 1, the executable file 400 may comprise multimedia software, including audio, video, or game software.

Figure 3:
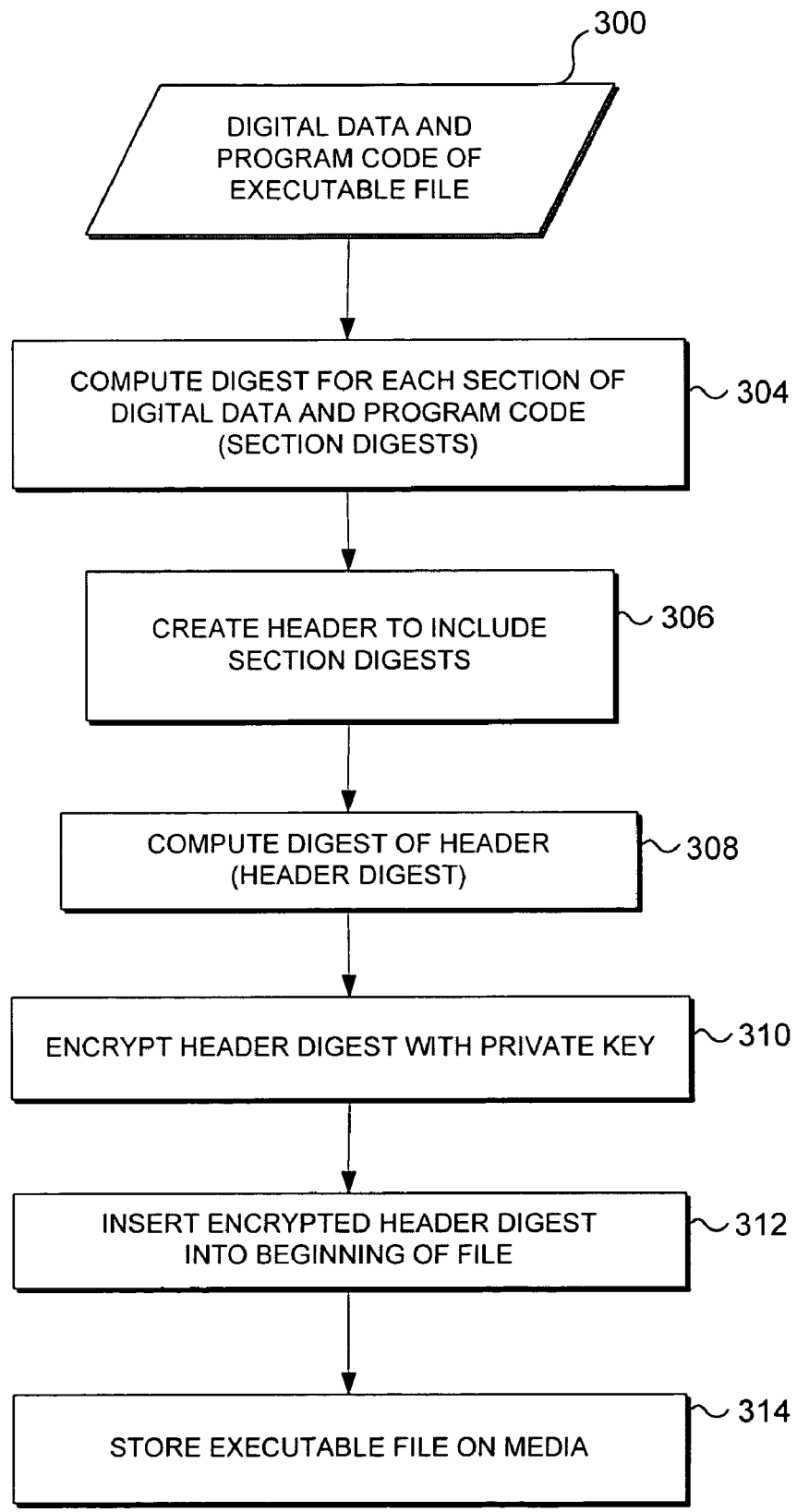
FIG. 3 is flow diagram illustrating aspects of a method of the present invention, in accordance with one embodiment thereof.
Figure 4:
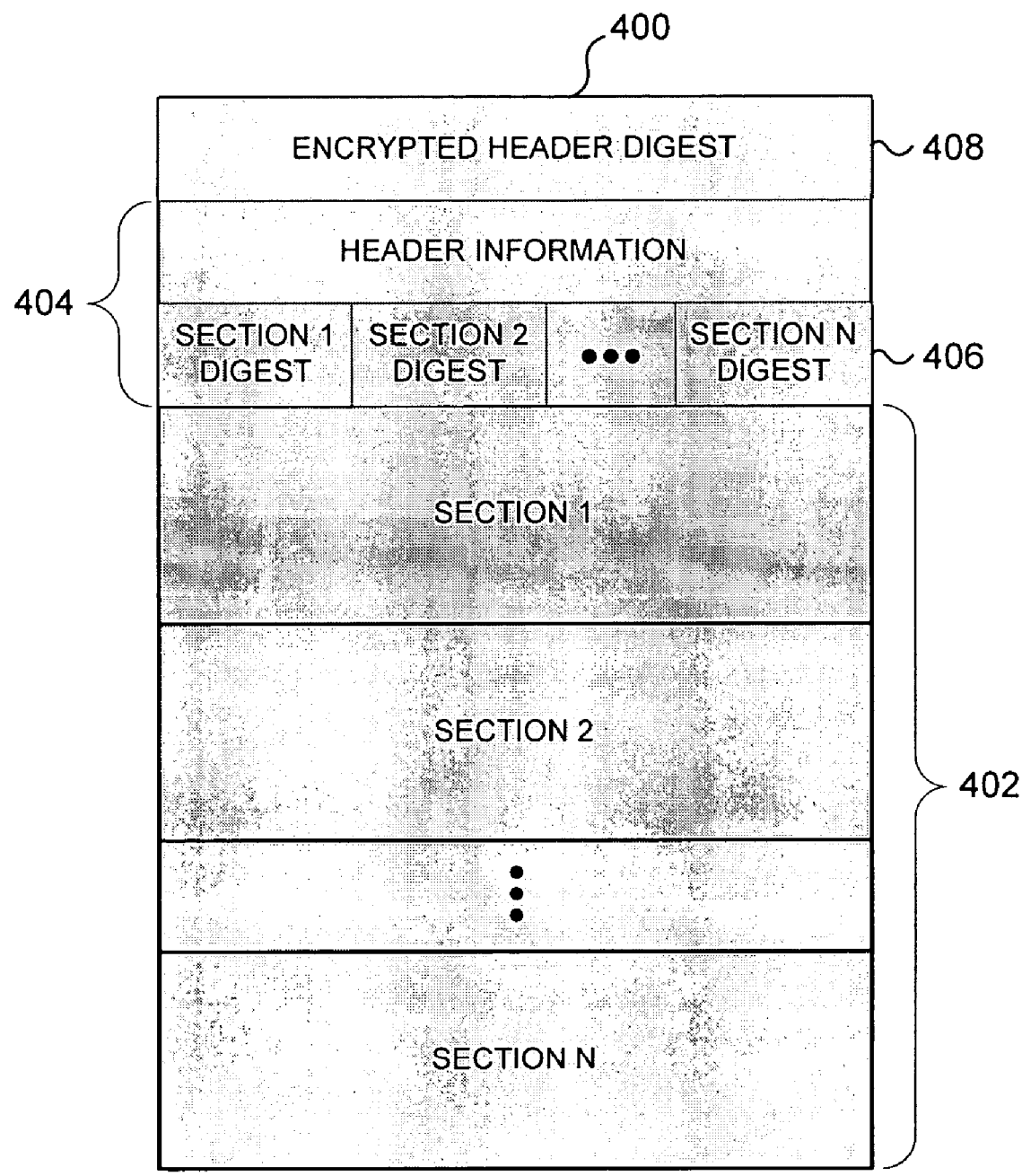
FIG. 4 is a diagram illustrating a file structure created using the method illustrated in FIG. 3, in accordance with one embodiment of the present invention.

FIG. 3 is a flow diagram illustrating a method used to secure the program code and data of an executable file in accordance with the format illustrated in FIG. 4, prior to distribution on portable media. As shown, at step 304, sections of the executable file are identified and a digest is computed for each section. Each digest is referred to as a section digest. Preferably, the section digests are computed with an algorithm such as version 1 of the Secure Hash Algorithm (SHA 1) as defined by the National Institute of Standards and Technology (NIST). Further information regarding SHA 1 is available at http://www.itl.nist.gov/fipspubs/fip180-1.htm. It is understood, however, that other algorithms may be employed for computing the section digests, and the present invention is by no means limited to any particular algorithm.

At step 306, a header for the file is created that includes each of the section digests, and any other information that may be desired for inclusion in the header of the file. A digest of the entire header is then generated, at step 308, producing a header digest. At step 310, the header digest is encrypted with a private key. Preferably, the private key is part of a digital signature algorithm for securing and authenticating digital data, so that a corresponding public key can be used to confirm the authenticity of the data and decrypt the data. Additional information regarding digital signature algorithms may be found at http://csrc.nist.gov/publications/fips/fips186 2/fips186 2.pdf. Any suitable digital signature algorithm may be employed.

Once the header digest is encrypted, it is inserted into the file at step 312. At step 314, the executable file may then be stored on portable media or other storage devices for distribution. For example, the executable file can be stored on a CDROM or DVD for distribution to end users having an appropriate multimedia console.

FIGS. 5, 6, 7, and 8 are flow diagrams illustrating the operation of the system of the present invention described above, as well as one embodiment of a method of ensuring that an executable file is properly signed and that it has not been tampered with in accordance with the present invention. The method is illustrated and described in FIGS. 5 through 8 in the context of the executable file format illustrated in FIG. 4 and in the context of the system illustrated in FIGS. 1 and 2. It is understood, however, that the method of the present invention is not limited to the embodiment shown.

Figure 5:
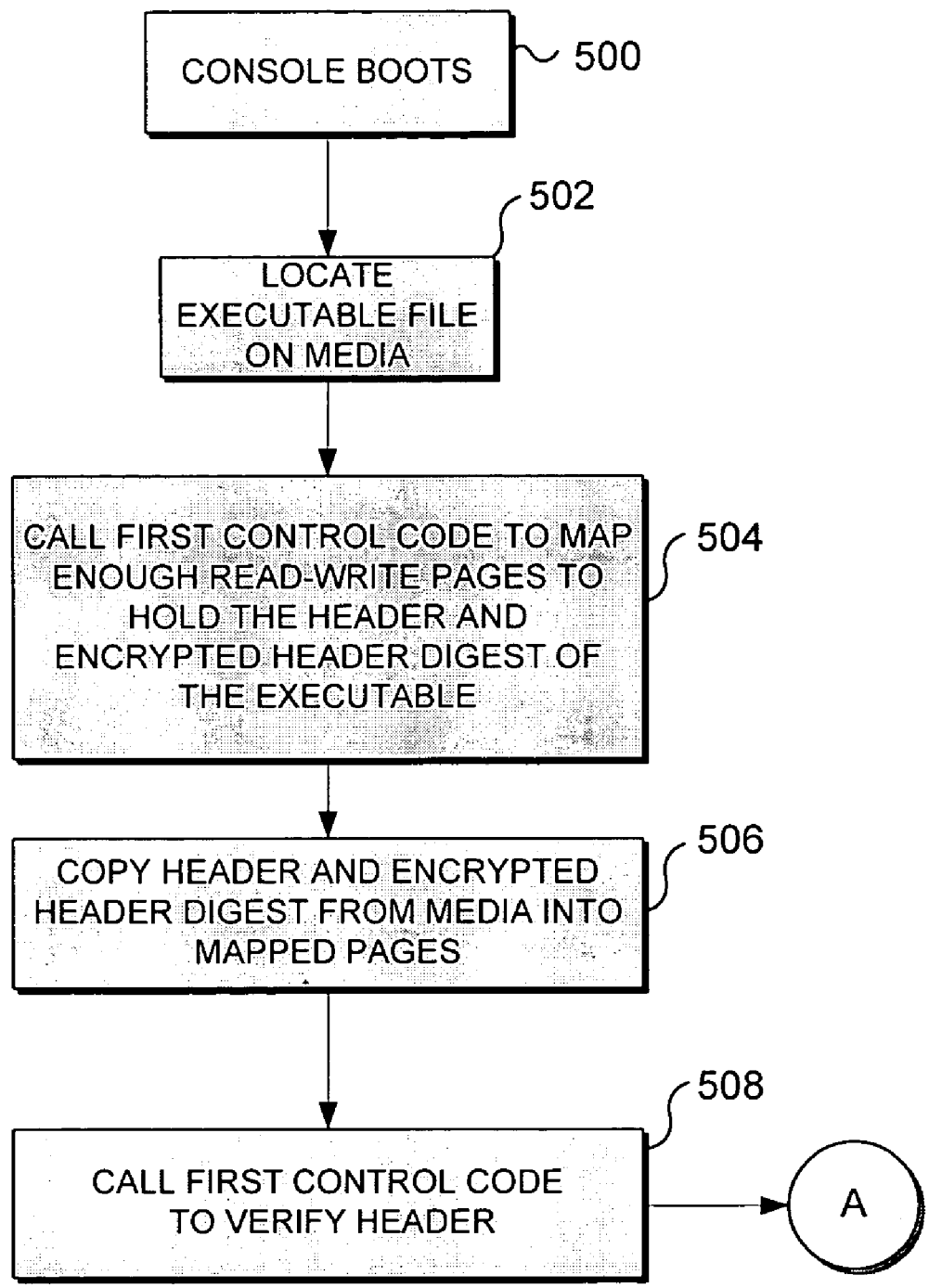
FIG. 5 is a flow diagram illustrating additional aspects of a method of the present invention, in accordance one embodiment thereof.

Referring to FIG. 5, in the present embodiment, after the multimedia console 100 successfully boots (step 500), the second control code 204 locates an executable file to be loaded into the memory 112 of the console and executed (step 502). The executable file may, for example, reside on a portable medium that has been inserted into the media drive 144. Next, at step 504, the second control code 204 calls the first control code 202 (via its API) to request that enough virtual memory be mapped to real memory to hold the header and encrypted header digest of the executable file. The second control code 204 requests that this memory comprise writable pages. Next, at step 506, the second control code copies the header and encrypted header digest from the media into the mapped, writable pages in memory. At step 508, the second control code 204 then calls the first control code 202 to request that it verify the digital signature associated with the header. It should be noted that while the method is described in the context of a single executable file, the steps of the method illustrated in FIGS. 5 through 8 can be performed on multiple files simultaneously, in which case multiple headers (and their respective encrypted header digests) would be loaded into memory and verified together.

Figure 6:
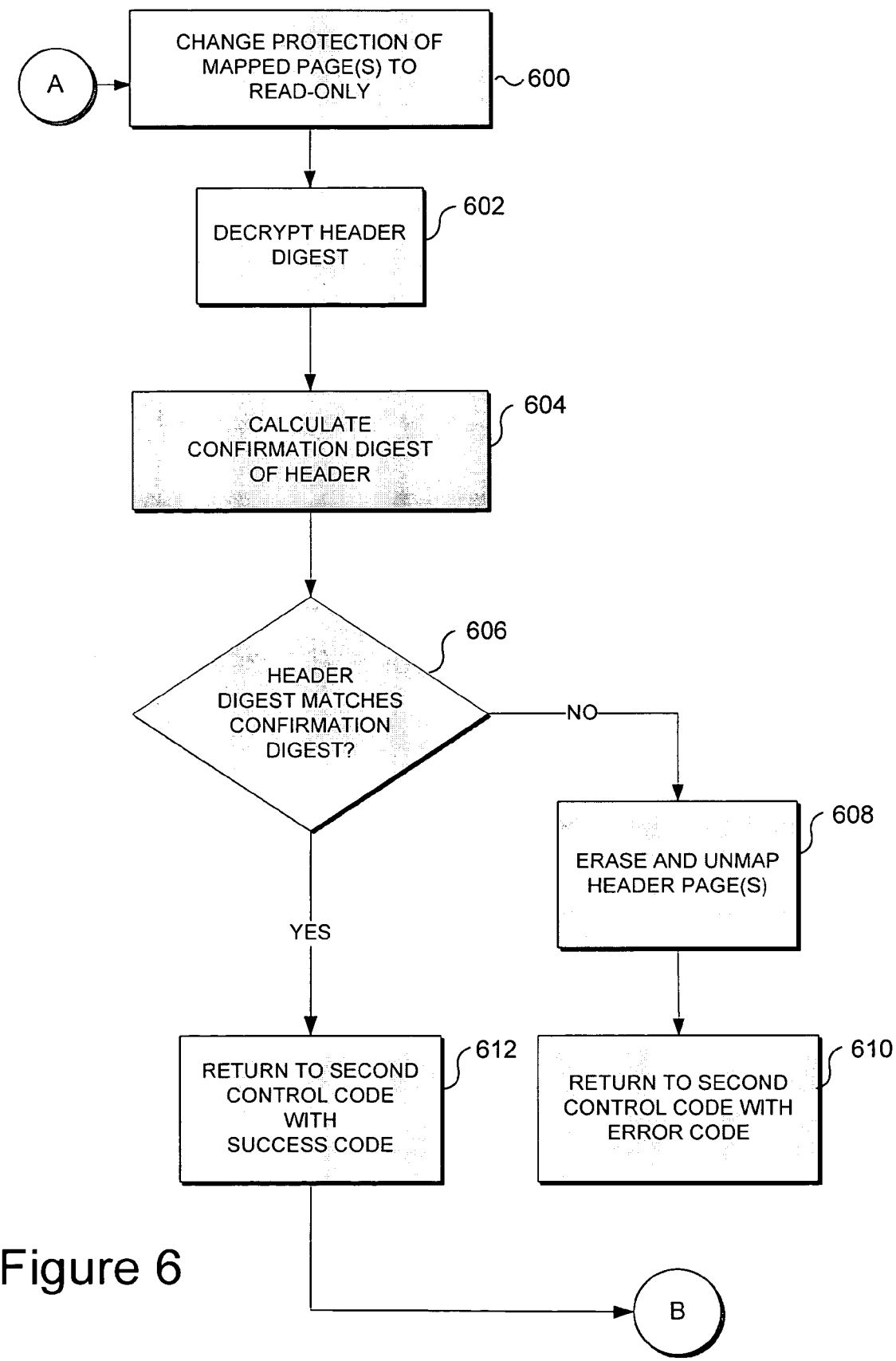
FIG. 6 is a flow diagram illustrating further aspects of a method of the present invention, in accordance one embodiment thereof.

Referring to FIG. 6, preferably at step 600, the first control code 202 changes the access permission of the pages in which the header and encrypted header digest is stored from writable to read-only. This prevents accidental or malicious tampering with the header information. In other embodiments, where there may not be a risk of the header being tampered with during the verification steps discussed below, this step may be performed at a later time. However, this step should be performed at least before returning to the second control code 204 in step 612 below.

At step 602, a public key that corresponds to the private key used to encrypt the header digest of the file is used to decrypt the encrypted header digest. At step 604, a digest of the header (which includes the section digests and other header information but not any portion of the encrypted header digest) is computed using the same algorithm (e.g., SHA 1) used to create the original header digest. The computed digest defines a confirmation digest. At step 606, the confirmation digest is compared to the decrypted digest. If the digests do not match, then the first control code 202 erases and unmaps the pages of memory that contain the header (step 608) and returns to the second control code 204 with an error code. The attempt to load the executable file thus fails. If, however, the digests match, then the first control code 202 returns to the second control code 204 with a success code.

Figure 7:
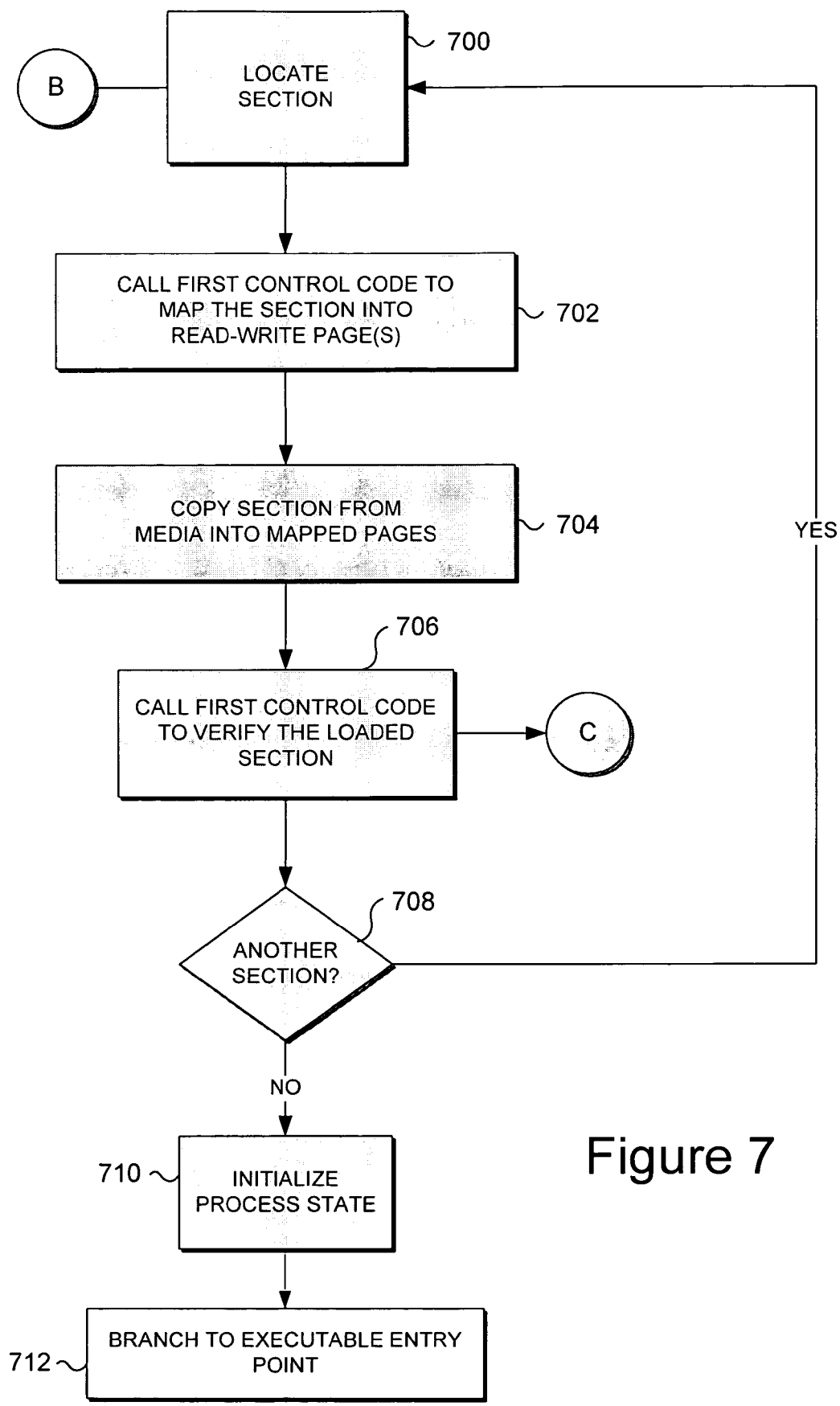
FIG. 7 is a flow diagram illustrating yet further aspects of a method of the present invention, in accordance one embodiment thereof.

Referring now to FIG. 7, assuming that the header is successfully verified, steps 700 through 706 are then performed for each section of the file. In an alternative embodiment, these steps may only be performed for certain sections marked "preload." A preload section is one that is necessary for the software to initialize itself. In such an embodiment, it is only necessary initially to load the preload sections. Other sections would then be loaded as needed.

At step 700, a section of the file to be loaded is located on the media. At step 702, the second control code 204 calls the first control code 202 to request that enough writable, virtual memory pages be mapped to real memory to load the section. Next, at step 704, the second control code 204 copies the section from the media into the mapped pages. At step 706, the second control code 204 calls the first control code 202 to request that it verify the loaded section. This process will be repeated for each section to be loaded.

Figure 8:
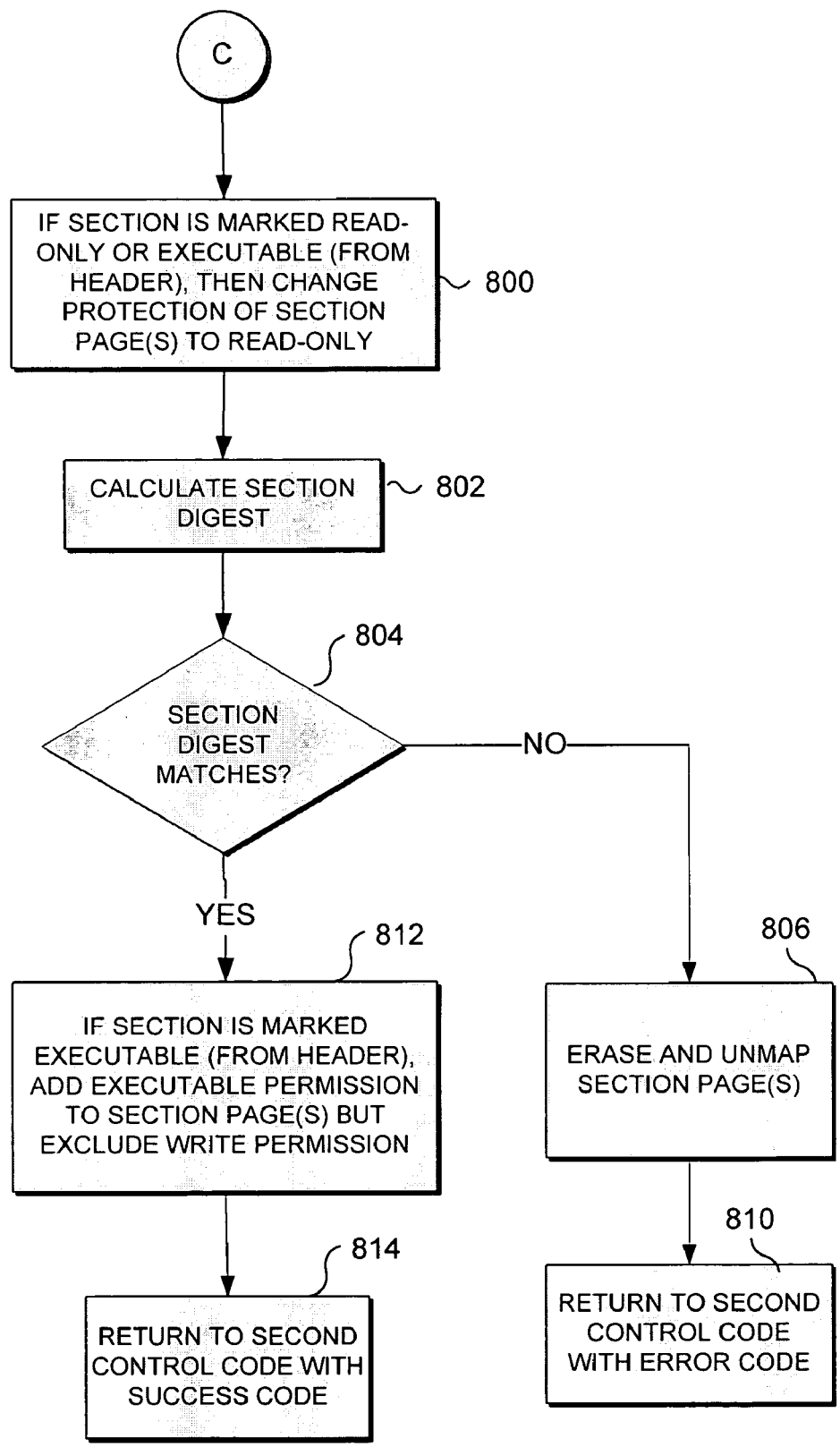
FIG. 8 is a flow diagram illustrating still further aspects of a method of the present invention, in accordance one embodiment thereof.

FIG. 8 illustrates the steps performed by the first control code 202 to verify a section. At step 800, if the header of the executable file indicates that the section is intended to be read-only or executable, the first control code 202 changes the access permission on the mapped pages containing the section to read-only. At step 802, the first control code 202 computes a confirmation digest on the section using the same algorithm used to compute the section digest in the header of the executable file. At step 804, the confirmation digest is compared with the section digest included in the header. If the comparison fails, then the first control code 202 erases and unmaps any section pages that have been loaded (step 806) and returns to the second control code 204 with an error. The loading of the executable file thus fails.

If, however, the comparison is successful, then the section has been verified. That is, a successful comparison indicates that the section is identical to its state at the time it was stored on the portable media and that it has not been modified or tampered with. At step 812, if the section contains executable program code (as opposed to only data), then the first control code 202 changes the access permission of the pages containing the section to include the EXECUTE permission and to exclude the WRITE permission. At step 814, the first control code 202 returns to the second control code 204 with a success code.

Referring again to FIG. 7, if all of the sections are verified and properly loaded, then the second control code 204 initializes a process state for the executable at step 710, and then at step 712, causes the processor's instruction execution to branch to the entry point for the executable program code of the successfully loaded file. In the present embodiment, the program code of the executable file will execute in the supervisor virtual mode (privilege level 1). Thus, the method ensures that only properly signed executable files will be loaded and executed on the system and that the files have not been modified or tampered with prior to execution.

As is apparent from the above description, all or portions of the system and method of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, wherein when the program code is loaded into and executed by a machine, such as a computer or the console 100, the machine becomes an apparatus for practicing the invention. Computer readable media include, but are not limited to, RAM, ROM, EEPROM, flash memory or other memory technology, CDROM, digital versatile disks (DVD) or other optical disk storage, memory cards, memory sticks, magnetic cassettes, magnetic tape, magnetic disk storage or other magnetic storage devices, or any other medium which can be used to store the information and which can be accessed by the console 400. The program code may be implemented in a high level procedural or object oriented programming language. Alternatively, the program code can be implemented in an assembly or machine language. In any case, the program code may be executed in compiled form or via interpretation.

As the foregoing illustrates, the present invention is directed to systems and methods for ensuring that only properly signed program code is executed on the system and that the program code has not been modified or altered prior to execution. It is understood that changes may be made to the embodiments described above without departing from the broad inventive concepts thereof. For example, while the invention has been described above as embodied in a multimedia console, it is understood that the present invention may be embodied in many other types of computing devices including, by way of example and without any intended limitation, satellite receivers, set top boxes, arcade games, personal computers (PCs), portable telephones, personal digital assistants (PDAs), and other hand-held devices. As such, the invention can be applied to a variety of forms of digital data and program code such as simulations, images, video, audio, text, games, operating systems, application programs or any other forms of software. Moreover, the method and system of the present invention can easily be applied to or modified for use in controlling access to digital data and program code over almost any type of network, distributed on almost any type of media or via almost any type of propagation medium, including, for example, radio frequency transmissions and optical signals, without limitation. Accordingly, it is understood that the present invention is not limited to the particular embodiments disclosed, but is intended to cover all modifications that are within the spirit and scope of the invention as defined by the appended claims.

What is claimed is:

1. A method for ensuring secure execution of an executable file in a system comprising a processor and a memory, wherein the processor supports different privilege levels and wherein only first program code executing at a first one of the privilege levels is permitted to map memory and to designate the mapped memory as read-only, writable, and executable, the method comprising the following steps performed by said first program code executing at said first one of the privilege levels of the processor:

in response to a request from other program code executing at a different privilege level to allocate a portion of memory for loading an executable file that is separate from said first program code and said other program code, mapping a portion of memory for loading the executable file, the mapped portion of memory being accessible to said other program code;

after the executable file has been loaded into the mapped portion of memory, designating the mapped portion of memory as read-only and verifying a signature associated with the executable file; and if the signature is verified, then thereafter designating the mapped portion of memory as executable, but not writable, and permitting the executable file to be executed at a privilege level other than the first one of the privilege levels, but if the signature is not verified, then preventing the executable file from being executed on the processor.

2. The method recited in claim 1, wherein the signature associated with the executable file comprises a digest of at least a portion of the file, the digest being encrypted using a private key, and wherein said step of verifying the signature of the file comprises:

decrypting the encrypted digest using a public key that corresponds to the private key;

computing a confirmation digest of said at least a portion of the file, said confirmation digest being produced using a method identical to that used to produce the digest that was encrypted; and comparing the confirmation digest to the decrypted digest, wherein the signature is verified if the confirmation digest and the decrypted digest are identical.

3. The method recited in claim 2, wherein the executable file comprises a header and one or more sections, wherein the encrypted digest is a digest of the header of the file, and wherein the header of the file contains one or more section digests each corresponding to a respective one of the sections of the file, the method further comprising, for each of the one or more sections of the file:

computing a confirmation digest for the section of the file using a method identical to that used to produce the corresponding section digest in the header of the file; and comparing the confirmation digest to the corresponding section digest in the header of the file, wherein the file is prevented from being executed on the processor if, for any section of the file, the confirmation digest does not match the corresponding section digest in the header of the file.

4. The method recited in claim 3, wherein said mapping step comprises mapping a first portion of memory for loading the header of the file, and then only after performing said steps of computing a confirmation digest of the header and comparing the confirmation digest of the header to the decrypted digest of the header, mapping a second portion of memory for loading the one or more sections of the file.

5. The method recited in claim 2, wherein the digest that was encrypted was produced by applying a hashing algorithm to said at least a portion of the file, and wherein said step of computing a confirmation digest comprises producing said confirmation digest using the same hashing algorithm used to produce the digest that was encrypted.

6. The method recited in claim 5, wherein the hashing algorithm comprises a SHA-1 algorithm.

7. The method recited in claim 1, wherein said step of permitting the executable file to be executed comprises branching to an entry point of the executable file in the memory.

8. The method recited in claim 1, further comprising preventing a mapped portion of memory that has been designated as writable from also being designated as executable.

9. The method recited in claim 1, wherein said step of mapping a portion of memory comprises mapping a virtual page of memory to a real page of memory.

10. The method recited in claim 1, wherein the recited steps are performed in a real mode of the processor.

11. A computer readable storage medium, where the computer readable storage medium is not a signal, having program code stored therein for use in a system comprising a processor and a memory, wherein the processor supports different privilege levels and wherein only first program code executing at a first one of the privilege levels is permitted to map memory and to designate the mapped memory as read-only, writable, and executable, the first program code, when executed by the processor at said one privilege level, causing the processor to perform the following steps:

in response to a request from other program code executing at a different privilege level to allocate a portion of memory for loading an executable file that is separate from said first program code and said other program code, mapping a portion of memory for loading the executable file, the mapped portion of memory being accessible to said other program code;

after the executable file has been loaded into the mapped portion of memory, designating the mapped portion of memory as read-only and verifying a signature associated with the executable file; and if the signature is verified, then thereafter designating the mapped portion of memory as executable, but not writable, and permitting the executable file to be executed at a privilege level other than the first one of the privilege levels, but if the signature is not verified, then preventing the executable file from being executed on the processor.

12. The computer-readable storage medium recited in claim 11, wherein the signature associated with the executable file comprises a digest of at least a portion of the file, the digest being encrypted using a private key, and wherein said step of verifying the signature of the file comprises:

decrypting the encrypted digest using a public key that corresponds to the private key;

computing a confirmation digest of said at least a portion of the file, said confirming digest being produced using a method identical to that used to produce the digest that was encrypted; and comparing the confirmation digest to the decrypted digest, wherein the signature is verified if the confirmation digest and the decrypted digest are identical.

13. The computer-readable medium storage recited in claim 12, wherein the executable file comprises a header and one or more sections, wherein the encrypted digest is a digest of the header of the file, wherein the header of the file contains one or more section digests each corresponding to a respective section of the file, and wherein the first program code further causes the processor to perform the following additional steps for each of the one or more sections of the file:

compute a confirmation digest for the section of the file using a method identical to that used to produce the corresponding section digest in the header of the file; and compare the confirmation digest to the corresponding section digest in the header of the file, wherein the file is prevented from being executed on the processor if, for any section of the file, the confirmation digest does not match the corresponding section digest in the header of the file.

14. The computer-readable storage medium recited in claim 13, wherein said mapping step comprises mapping a first portion of memory for loading the header of the file, and then only after the first program code performs said steps of computing a confirmation digest of the header and comparing the confirmation digest of the header to the decrypted digest of the header, mapping a second portion of memory for loading the one or more sections of the file.

15. The computer-readable storage medium recited in claim 12, wherein the digest that was encrypted was produced by applying a hashing algorithm to said at least a portion of the file, and wherein said step of computing a confirmation digest comprises producing said confirmation digest using the same hashing algorithm used to produce the digest that was encrypted.

16. The computer-readable storage medium recited in claim 15, wherein the hashing algorithm comprises a SHA-1 algorithm.

17. The computer-readable storage medium recited in claim 11, wherein said step of permitting the executable file to be executed comprises causing the processor to branch to an entry point of the executable file in the memory.

18. The computer-readable storage medium recited in claim 17, wherein the first program code prevents any mapped portion of memory that has been designated as writable from also being designated as executable.

19. The computer-readable storage medium recited in claim 11, wherein said first program code causes the processor to map a virtual portion of memory to a real portion of memory for loading the executable file.

20. The computer-readable storage medium recited in claim 11, wherein the first program code executes in a real mode of the processor.

21. A computer system comprising:

a memory;

a processor that supports different privilege levels, only program code executing at a first one of the privilege levels being permitted to map memory and to designate the mapped memory as read-only, writable, and executable;

first control code executing in a secure RAM within the processor at said first one of the privilege levels, the first control code, in response to a request from second control code executing at a different privilege level to allocate a portion of memory for loading an executable file that is separate from said first control code and said second control code, mapping a portion of memory for loading the executable file, the mapped portion of memory being accessible to said second control code, and after the executable file has been loaded into the mapped portion of memory by the second control code, the first control code designating the mapped portion of memory as read-only and verifying a signature associated with the executable file, wherein the executable file comprises a header and one or more sections, wherein the signature associated with the executable file comprises an encrypted digest of the header, the digest being encrypted using a private key, and wherein the header of the file contains one or more section digests each corresponding to a respective one of the one or more sections of the file, and wherein the first control code verifies the signature by:

decrypting the encrypted digest of the header using a public key that corresponds to the private key;

computing a confirmation digest of the header of the file, said confirmation digest being produced using a method identical to that used to produce the digest that was encrypted; and for each of the one or more sections of the file:

computing a confirmation digest for the section of the file using a method identical to that used to produce the corresponding section digest in the header of the file; and comparing the confirmation digests of the header and of each section to the corresponding digests of the header of the sections of the file contained in the header, wherein the signature is verified only if the confirmation digests and the corresponding decrypted digests are identical, and wherein if the signature is verified, the first control code designates the mapped portion of memory containing the executable file as executable at a privilege level other than the first one of the privilege levels, prevents that mapped portion of memory from also being designated as writable, and branches to an entry point of the executable file in the memory, but if the signature is not verified, the first control code erases and unmaps the mapped portion of memory thereby preventing the executable file from being executed on the processor.

22. The computer system recited in claim 21, wherein the first control code maps a first portion of memory for loading the header of the file, and then only after computing a confirmation digest of the header and comparing the confirmation digest of the header to the decrypted digest of the header, maps a second portion of memory for loading the one or more sections of the file.

23. The computer system recited in claim 21, wherein the first control code prevents any mapped portion of memory that has been designated as executable from also being designated as writable.

24. The computer system recited in claim 21, wherein the first control code prevents any mapped portion of memory that has been designated as writable from also being designated as executable.

* * * * *